United States Patent [19]
Elsdon et al.

[11] Patent Number: 5,755,256
[45] Date of Patent: May 26, 1998

[54] AUTOMATIC SHUTOFF FUELING SYSTEM

[75] Inventors: Stanley Robert Elsdon, Etobicoke; Gordon Elford Fairles, Toronto; Maximilian Masley, Etobicoke; Arthur Selwyn Cornford, Mississauga, all of Canada

[73] Assignee: Emco Wheaton Fleet Fueling Corp., Oakville, Canada

[21] Appl. No.: 794,408

[22] Filed: Feb. 3, 1997

[51] Int. Cl.[6] .................................................. B65B 57/14
[52] U.S. Cl. ........................ 137/390; 141/206; 141/207; 141/346
[58] Field of Search ........................... 137/390; 141/206, 141/207, 346

[56] References Cited

U.S. PATENT DOCUMENTS

| | | |
|---|---|---|
| 2,320,033 | 4/1943 | Davis . |
| 2,840,122 | 6/1958 | Klikunas et al. . |
| 2,851,065 | 9/1958 | Klikunas et al. . |
| 4,607,658 | 8/1986 | Fraser et al. ........................ 137/390 |
| 5,392,824 | 2/1995 | Rabinovich ........................ 141/206 |
| 5,450,884 | 9/1995 | Shih et al. ......................... 141/206 |
| 5,598,877 | 2/1997 | Reidel ............................... 141/346 |
| 5,609,195 | 3/1997 | Stricklin et al. ................... 141/346 |
| 5,634,505 | 6/1997 | Wong ................................. 141/346 |

FOREIGN PATENT DOCUMENTS

| | | |
|---|---|---|
| 1084015 | 8/1980 | Canada . |
| 39 39 685 | 6/1991 | Germany ........................... 141/206 |
| 1-308797 | 12/1989 | Japan ................................. 141/206 |

*Primary Examiner*—Erick R. Solis
*Attorney, Agent, or Firm*—Evenson, McKeown, Edwards & Lenahan P.L.L.C.

[57] ABSTRACT

This invention relates to systems in which fluid, usually liquid fuel (typically diesel fuel oil) is transferred from a supply station to a tank on a vehicle such as a truck or bus by means of a hose, an automatic shutoff nozzle and a fill neck on the vehicle tank. In the system, both a nozzle extension and a quieting tube arrangement are provided which extend into the tank so that they are in close proximity to the bottom. In this manner the impact of fuel forming is substantially reduced and hence false shut offs of fuel supply are eliminated.

13 Claims, 3 Drawing Sheets

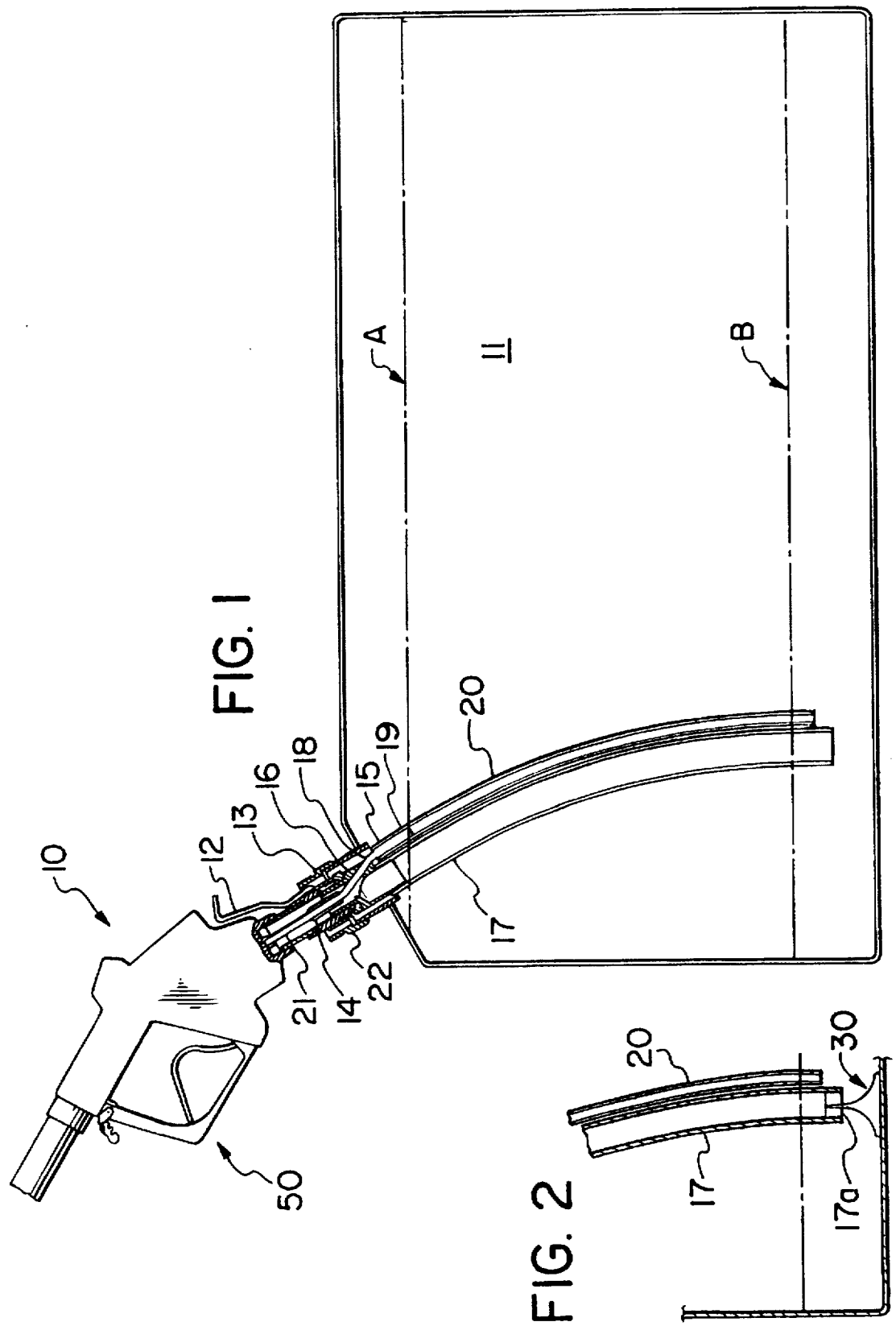

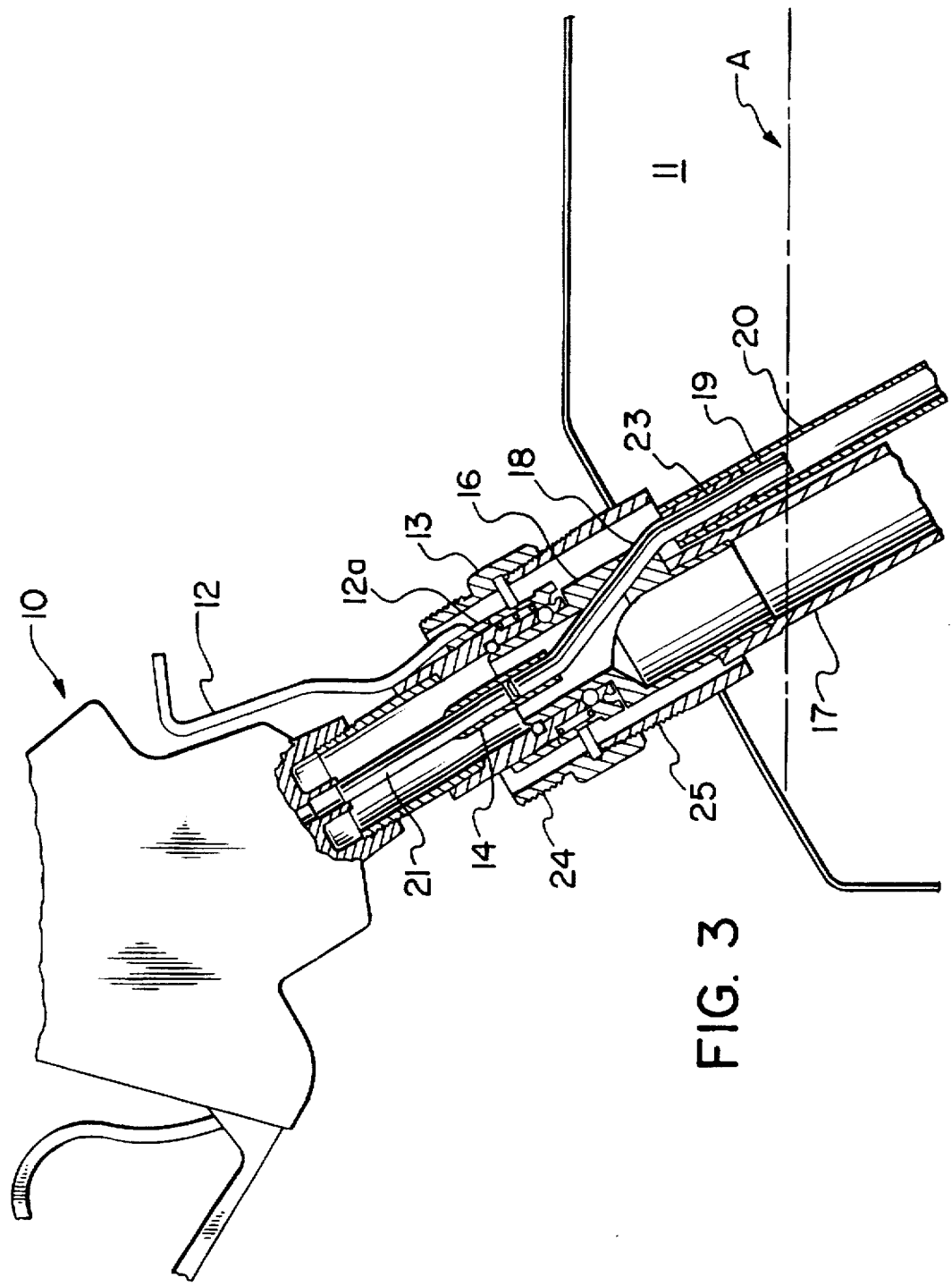

AUTOMATIC SHUTOFF FUELING SYSTEM

FIELD OF THE INVENTION

This invention relates to systems in which fluid, usually liquid fuel (typically diesel fuel oil) is transferred from a supply station to a tank on a vehicle such as a truck or bus by means of a hose, an automatic shutoff nozzle and a fill neck on the vehicle tank.

BACKGROUND OF THE INVENTION

In existing practice, such systems commonly use a nozzle which can be latched open and an automatic shutoff valve in the nozzle, so constructed that flow of fuel induces a sub-atmospheric pressure which acts on a diaphragm in the valve connected with a tripping mechanism of the nozzle. When the liquid level in the tank is low, negative pressure exerted on the diaphragm is relieved through a vacuum relief, or shutoff tube which extends from the shutoff valve to a point close to the nozzle discharge end. When the liquid level in the tank rises to cover an end of the shutoff tube, a vacuum develops to act on the diaphragm the consequent flexure of which causes the valve to trip, preventing further flow of fuel into the tank.

Some fluids dispensed by a nozzle as described above have a tendency to generate a considerable volume of foam within the receiving tank, and when this foam rises to cover the end of the shutoff tube, the sensitive automatic shutoff valve may be tripped although the true liquid level may be considerably lower than that desired at shutoff. To overcome this problem a second tube, sometimes called a quieting tube, may be installed, usually within the shutoff tube, with one end in proximity to the sensing end of the shutoff tube and the other end open to atmosphere at a higher elevation than the intended final liquid level. With this arrangement, although the foam may reach the end of the sensing tube, the quieting tube assures atmospheric pressure at this point and the valve will not trip until the true liquid level reaches the end of either the shutoff tube or the quieting tube, depending on their relative disposition.

If, as may happen, the orifice at the entrance from the atmosphere to the quieting tube becomes obstructed, the quieting tube will be ineffective in its function of preventing premature shutoff of the fuel supply.

RELATED PRIOR ART

An example of a typical apparatus of this type can be found in U.S. Pat. No. 2,851,065 issued Sep. 9, 1958 to R. V. Klikunas et al. The nozzle comprises a valve and a discharge spout, a latch to hold the valve open, a vacuum tripping device operable to trip the latch to permit the valve to close, means responsive to flow of fluid through the nozzle to draw a suction on said tripping device, a vacuum relief tube leading from said tripping device to a point in the discharge spout that will be at the level to which a container is to be filled when the spout is inserted in the filler opening of the container, whereby the suction in the tripping device will be relieved until the liquid level in the container rises to a point where it will close off the end of said tube, and means for preventing foam on top of the liquid from causing a false tripping of the nozzle comprising a first conduit means leading from the end of the vacuum relief tube to a point on the discharge spout that will be below the said liquid level, and a second conduit means leading from the end of the vacuum relief tube to the atmosphere.

Current nozzle designs possess a number of disadvantages of which the following are examples: the level at which fuel shutoff occurs can vary depending on the manner in which the operator applies the nozzle into the fill neck; fuel spillage can easily result from careless manipulation of the nozzle in the fill neck; and splashing of the fuel entering the tank causes foaming to occur which can cause the fueling operation to be prematurely shut down, a condition not always preventable in the case of an obstructed quieting tube.

Thus there is a need for a fueling system in which shut off of fuel supply to the tank can be controlled reliably in response to the level of fuel in the tank, foaming of the fuel and the effect of foaming on premature shut off are minimized, and the environment is protected against spillage of fuel.

SUMMARY OF THE INVENTION

The present invention provides an automatic shutoff fluid filling assembly comprising a nozzle body component associated with a fluid supply and a nozzle extension component for mounting within a container to be filled;

the nozzle body component comprising a fluid filling nozzle having automatic shut off means actuated in response to changes in pressure within the nozzle body caused by the fluid when it reaches fill level within the container to be filled, and having fluid delivery actuation means associated with it;

the fluid filling nozzle comprising quick disconnect coupling means for securing the nozzle body component to the fill neck of the container to be filled;

operating means for the coupling means; and a shutoff tube mounted within a fluid delivery passage located within the coupling means, the shutoff tube being adapted to remoably engage an end of a shutoff tube extension associated with the nozzle extension component.

the nozzle extension component being adapted for secure mounting within a fill neck of the fluid container, and comprising quick-disconnect coupling adapter means for cooperating with the quick disconnect coupling means of the nozzle body component, the downstream end of the quick-disconnect coupling adapter means having secured thereto, a nozzle extension tube when extends to a position that is in close proximity to the bottom of the container to be filled;

the shutoff tube extension being mounted within the quick-disconnect coupling adapter means and passing through a wall of the quick-disconnect coupling adapter means, the upper end of the shutoff tube extension being located such that it engages the outermost end of the shutoff tube located within the nozzle body portion;

a quieting tube concentric with, attached to, and a spaced from the exterior of the shutoff tube extension near its lower end located outside the nozzle extension tube, the space between the quieting tube and the shutoff tube extension being seated at its upper end and open at its lower end, the quieting tube extending to a position that is in close proximity to the bottom of the container to be filled, the quieting tube having an opening to atmosphere at its upper and which lies within the fill neck of the container, and the lower end of the shutoff tube extension defines the full fill level for the container.

It will be apparent that the design of the present invention includes a number of unique characteristics including the following:

1. The functions of the nozzle body provided by the automatic shutoff valve, the nozzle spout and by an extension to the shutoff tube are all physically separate from each other. This allows the assembly to be used in a variety of different ways, particularly in retrofit circumstances.

2. The position of the shutoff tube extension is fixed within the tank so that the shutoff level is predetermined and unchanging, once the device is mounted within the tank.

3. The nozzle discharge has a fixed extension or spout within the tank with its outlet close to the tank bottom so that the outlet is submerged thereby minimizing foaming of the fuel upon entry into the fuel tank.

4. The extension to the quieting tube with its lower extremity submerged close to the tank bottom prevents the ingress of foam into the quieting tube, thereby precluding false or premature shutoffs.

5. The connection between the nozzle body and the fixed nozzle extension body and the shutoff tube extension is now positive during the fueling operation, which makes fueling less problematic for the operator.

6. A final and most important aspect is that the assembly may be retrofitted into conventional fueling assemblies.

BRIEF DESCRIPTION OF THE DRAWINGS

In the accompanying drawings which are used to illustrate the present invention.

FIG. 1 is a side view, partly in section of a nozzle assembly placed in a fuel tank;

FIG. 2 is a partial cross-sectional view of the plastic nozzle extension tube and the quieting tube of FIG. 1 provided with an optional flow diffuser;

FIG. 3 is an enlarged partial, cross sectional view of the nozzle assembly of FIG. 1;

DETAILED DESCRIPTION OF THE INVENTION

Figures 4, 5:
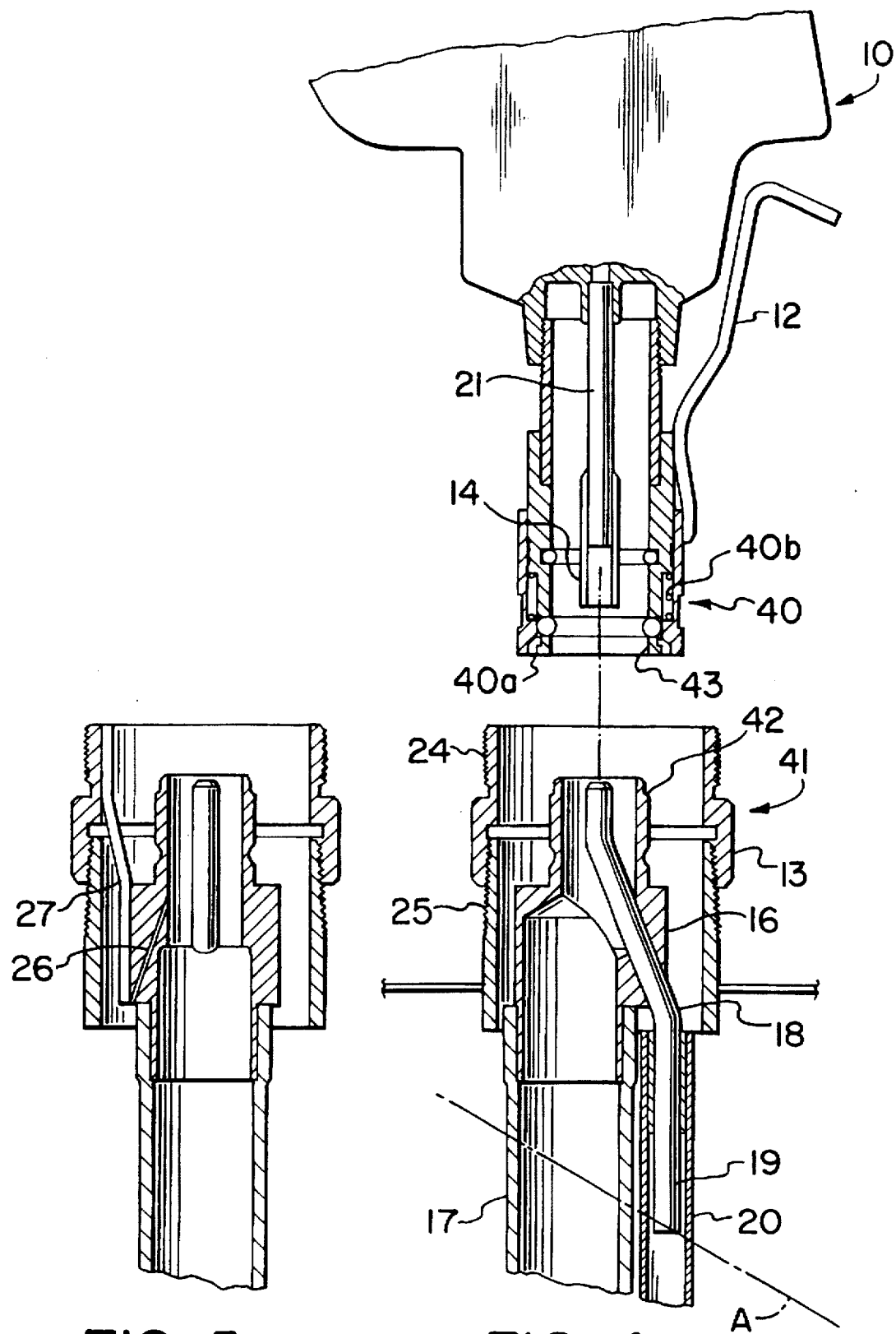
FIG. 4 is a partial cross-sectional view showing a nozzle body component and a nozzle extension component separately.
FIG. 5 is a cross-sectional view of the nozzle extension component so that a drainage vent is visible.

Referring now to the drawings, there is illustrated an automatic shutoff fueling system which comprises two separable components referred to hereinafter as the nozzle body assembly, shown generally at 40 and the nozzle extension assembly, shown generally at 41. The nozzle body assembly 40 consists of a commercially available fueling nozzle, such as the BIG MAC™ diesel nozzle manufactured by Catlow Inc. of Tipp City, Ohio, which for purposes of the present system is modified. In particular, the nozzle spout is replaced by the female member of a quick-disconnect coupling such as the commerically available Parker ST™ Series coupling as shown at 40 in FIG. 4. An extension handle 12 is attached by brazing, or other suitable means, as will be apparent to those skilled in the art, to the sliding actuating collar 12a of the coupling 40 to facilitate operation of the coupling 40. A shutoff tube 21 is shortened and truncated within the disconnect coupling 40 at a point set back from coupling face 41a which is approximately level with a threaded nose 40b of the nozzle, and is concentric with the disconnect coupling 40.

A compliant tubular sleeve 14 is secured over an end of the truncated shutoff tube 21 in such a fashion that it forms an easily separable coupling to a shutoff tube extension adapter 18, which is part of the nozzle extension assembly 41, which may be inserted into an open end of sleeve 14.

The nozzle extension assembly 41 comprises a male quick-disconnect coupling adapter 16, an end of which is sized to mate with a female coupling member 43 on the nozzle body assembly 40. A downstream end of the adapter 16 is machined so that an end of a nozzle extension tube 17, preferably formed of plastics, can be slid on and secured in place by means of a tube clamp (not shown) or other securing means. The length of the nozzle extension tube 17 is sufficiently long that its discharge end is in close proximity to a bottom of a fuel tank 11, for example the fuel tank of a vehicle, so that unless the tank 11 is completely drained, the nozzle extension tube outlet 17 will always be submerged in fuel.

In an alternative form of the invention, as can be seen in FIG. 2, a flow diffuser 30 may be installed at the outlet 17a of the nozzle extension tube 17 to reduce the impact of flow against a tank 11, bottom.

Shutoff tube extension adapter 18, preferably made of stainless steel, passes at an angle through the wall of the coupling adapter 16, and is so formed that at its upstream end, it is parallel with and concentric to the bore of the coupling adapter 16. Thus when the two members 40 and 41 of the coupling are engaged, the upstream end of the shutoff tube extension adapter 18, enters the open end of the tubular sleeve 14, as described previously. The downstream end of the shutoff tube extension adapter 18, having passed through the wall of the coupling adapter is formed in parallel relationship to the centre line of the coupling adapter 16.

A small diameter hole 26 is drilled in the wall of the coupling adapter, 16, in a suitable location (see FIG. 5) to facilitate draining of residual fluid in to the tank when the valve has tripped. This vents the interior of the assembly to atmosphere so that residual fluid can drain when the shutoff valve has been shut off.

One end of a shutoff tube extension 19, preferably made of flexible plastics material, is entered halfway into a close fitting short sleeve 23, preferably made of plastics material and the sleeve 23 in turn passes over the end of the shutoff tube extension adapter 18, the three parts being secured together by suitable means such as a sealing adhesive so as to form a continuous passage.

One end of a quieting tube 20, preferably flexible and plastic, whose internal diameter is a close fit with the outside diameter of the sleeve 23, is fitted over the sleeve and secured in place by a tube clamp. A number of small holes are drilled through the wall of the quieting tube 20, close to the sleeve 23, so that the interior of the quieting tube 20 will be at atmospheric pressure. The quieting tube 20 is sufficiently long that its lower end is in close proximity to the bottom of the tank 11 so that unless the tank 11 is completely drained, the end of the quieting tube 20 will always be submerged in fluid or fuel as the case may be. This can be seen as B indicates the level of the fuel in the tank before filling.

A threaded adapter 24, whose size, typically 2 in. (5 cm) National Pipe Thread, is selected to suit the size of the fill neck 25 of the tank to which the equipment is to be fitted. The neck has a bracket 27 (see in FIG. 5) attached internally.

The coupling adapter 16, is attached inside the bracket assembly 13, by suitable means, such as screws through bracket 27 (see in FIG. 5). When all of the parts of the nozzle extension assembly 40, 41 described above are assembled, it is possible to insert them through a tank fill neck 25 and to screw the bracket assembly, 13, onto the fill neck for permanent installation.

A standard tank cap (not shown) can be screwed onto the external threads of the bracket assembly to seal the tank against the environment between refueling operations. Such caps frequently incorporate over-pressure and high temperature relief mechanisms, or both.

It should be noted that rigid tubing may be used wherever reference has been made to flexible tubing, or combinations of both may be used. Also, while the lower end of the quieting tube 20 is indicated as being adjacent to the outlet of the nozzle extension tube 17, it may preferably be located remotely from the nozzle extension tube 17 to minimize the possible entry of entrained foam from the nozzle discharge flow.

In use, the assembly permits a very simple refueling operation. The procedure typically comprises the following steps:

1. The operator removes the tank cap.

2. The operator offers the nozzle to the tank fill neck and engages the two quick-disconnect coupling members 40, 41. This action secures the nozzle body to the fill neck while providing a continuous sealed passage for the liquid to the tank 11 bottom. It also provides a similarly sealed conduit between the upper end of the shutoff tube 21 and the lower end of the shutoff tube extension 19, the latter corresponding to the required liquid fill level.

3. The operator opens the nozzle valve by depressing a hand lever 50 and latching it open by suitable means. If the liquid level is at or above the shutoff tube extension end (Level A) the flow-induced vacuum will trip the valve closed. Otherwise, flow of fuel into the tank will proceed until the liquid level reaches the lower end of the shutoff tube extension 19 and the shutoff valve will be tripped closed. As the upper end of the quieting tube 20 is open to atmosphere within the fill neck, it will perform its function of negating false shutoff should any foam have entered therein as described below.

4. Since the internal construction of the shutoff valve is designed to generate a vacuum in the control system, some entrainment of air in the liquid during its passage through the nozzle may occur leading to a small amount of foam generation, typically some 1 to 2 inches (2.54 to 5.00 cm.) in height, in the tank 11. The immersion of the discharge end of the nozzle tube 17, be close to the desired fill level. It should be noted that malfunction of quieting below liquid surface B inhibits the generation of additional foam due to splashing. Thus, even in the case of quieting tube malfunction, the liquid level of shutoff will tube 17 due to obstruction of the atmospheric inlet is unlikely because there are a multiplicity of inlet holes—typically a minimum of four—and the atmospheric inlet holes are well protected by being located inside the tank fill neck rather than in the external environment as is the case with other automatic nozzle installations.

5. When the nozzle has tripped, the hand lever latch is automatically disengaged as is the case with conventional fuel nozzles. The female quick-disconnected coupling 40 is disengaged by pulling on the extension handle 12, and the nozzle 40 is removed to its standby location.

6. The tank cap (not shown) is then replaced by the operator.

The system of the present invention is designed so that known technology relating to the use of a vacuum to automatically shut off liquid flow at a predetermined level and the use of atmospheric pressure to minimize false shut off action in the presence of foam are employed, but modified to produce a unique result. Finally, the system utilizes a permanently mounted nozzle extension for a fluid or fuel tank, with its end submerged close to the tank bottom so that splashing and the resulting foam generation are prevented.

The use of a quieting tube, also permanently tank mounted, separate and remote from the nozzle and consequently protected from environmental contamination or obstruction offers significant advantages in use.

The increased efficiency of the quieting tube is increased by use of more than one atmospheric inlet to the quieting tube, this being made possible by the fact that the quieting tube is on the outside of the shutoff tube.

Finally, the placement of the lower end of the quieting tube close to the tank bottom so that surface foam is prevented from entering the end of the tube, thereby improving the efficiency of true liquid level sensing prior to shut off, offers more reliable fueling operations.

It will be apparent to a person skilled in the art that many modifications or substitutions may be made to the components of this system. However, such modifications or substitutions as would be apparent to a person skilled in the art fall within the scope of the appended claims.

What we claim is:

1. An automatic shutoff fluid filling assembly comprising a nozzle body component associated with a fluid supply and a nozzle extension component for mounting within a container to be filled;

the nozzle body component comprising a fluid filling nozzle having automatic shut off means actuated in response to changes in pressure within the nozzle body caused by the fluid when it reaches fill level within the container to be filled, and having fluid delivery actuation means associated with it; the fluid filling nozzle comprising quick disconnect coupling means for securing the nozzle body component to the fill neck of the container to be filled;

operating means for the coupling means; and a shutoff tube mounted within a fluid delivery passage located within the coupling means, the shutoff tube being adapted to removably engage an end of a shutoff tube extension associated with the nozzle extension component;

the nozzle extension component being adapted for secure mounting within a fill neck of the fluid container, and comprising quick-disconnect coupling adapter means for cooperating with the quick disconnect coupling means of the nozzle body component, the downstream end of the quick-disconnect coupling adapter means having secured thereto, a nozzle extension tube which extends to a position that is in close proximity to the bottom of the container to be filled;

the shutoff tube extension being mounted within the quick-disconnect coupling adapter means and passing through a wall of the quick-disconnect coupling adapter means, the upper end of the shutoff tube extension being located such that it engages the outermost end of the shutoff tube located within the nozzle body portion;

a quieting tube concentric with, attached to, and spaced from the exterior of the shutoff tube extension near its lower end located outside the nozzle extension tube, the space between the quieting tube and the shutoff tube extension being sealed at its upper end and open at its lower end, the quieting tube extending to a position that is in close proximity to the bottom of the container to be filled, the quieting tube having an opening to atmosphere at its upper end which lies within the fill neck of the container, and the lower end of the shutoff tube extension defines the full fill level for the container.

2. An automatic fluid filling assembly as claimed in claim 1 wherein means are provided in the coupling adapter for venting to atmosphere for draining residual fluid when the shutoff valve in the nozzle component has been actuated.

3. An automatic fluid filling assembly as claimed in claim 2, wherein the fluid is fuel and the container is a fuel tank of a vehicle.

4. An automatic fluid filling assembly as claimed in claim 3, wherein the fluid is diesel fuel.

5. An automatic fluid filling assembly as claimed in claim 4, wherein the fluid delivery actuation means is a hand operated lever which may be held open by latching means.

6. An automatic fluid filling assembly as claimed in claim 5, wherein the quick disconnect coupling adapter means associated with the nozzle body component is a female member and the quick disconnect coupling adapter means associated with the nozzle extension component is a male member.

7. An automatic fluid filling assembly as claimed in claim 6, wherein the coupling means includes operating means therefor.

8. An automatic fluid filling assembly as claimed in claim 7, wherein the operating means for the coupling means comprises a handle which releases the connection between the cooperating coupling means.

9. An automatic fluid filling assembly as claimed in claim 8, wherein the shutoff tube and the shutoff tube extension are concentrically located within the cooperating coupling adapter means, and the outermost end of the shutoff tube extension is flexible and of a diameter so as to permit the upper end of the shutoff tube extension to be sealing engaged therein, upon engagement of the quick disconnect coupling means and the coupling adapter means.

10. An automatic fluid filling assembly as claimed in claim 9, wherein the quieting tube and the nozzle extension tube are parallel and in close proximity to each other and both are made of flexible material or rigid material or a combination of such materials.

11. An automatic fluid filling assembly as claimed in claim 10, wherein the downstream ends of the quieting tube and the nozzle extension tube are located remotely from each other.

12. An automatic fluid filling assembly as claimed in claim 11, wherein the quieting tube has a plurality of holes in its upper end so that it is open to atmosphere at all times.

13. An automatic fluid filling assembly as claimed in claim 12, wherein at the end of the nozzle extension tube, there is provided a flow diffuser.

\* \* \* \* \*